T. HILL.
HOSE CLAMP.
APPLICATION FILED APR. 24, 1919.
1,309,476. Patented July 8, 1919.
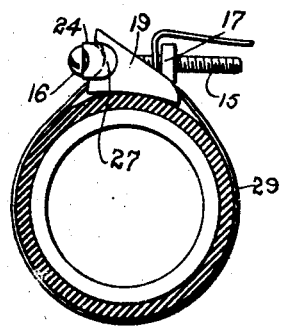
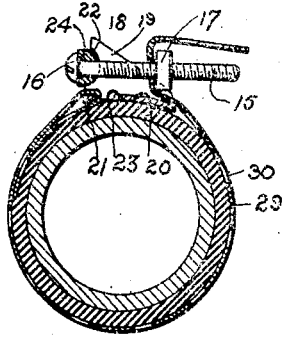
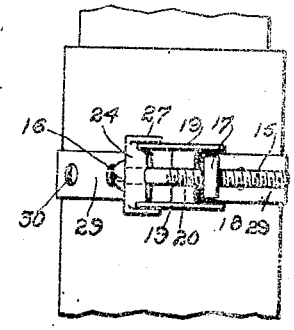
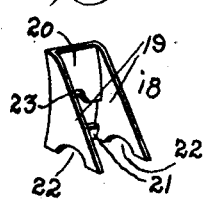
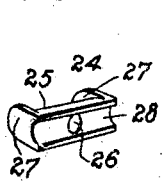
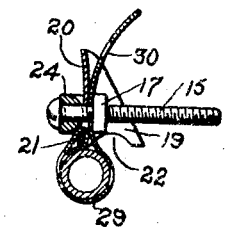
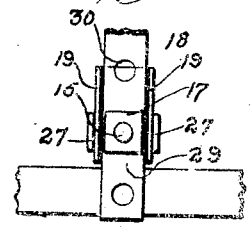
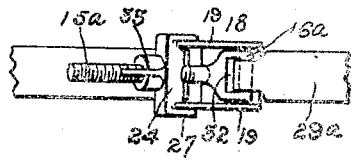
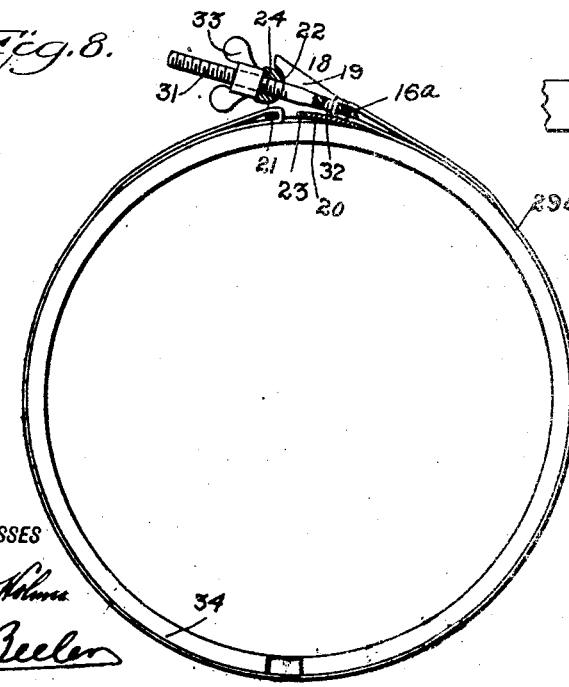
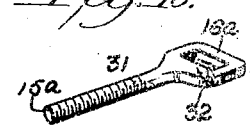
WITNESSES
INVENTOR
Thomas Hill
BY
ATTORNEYS

UNITED STATES PATENT OFFICE.

THOMAS HILL, OF NEW YORK, N. Y.

HOSE-CLAMP.

1,309,476.    Specification of Letters Patent.    Patented July 8, 1919.

Application filed April 24, 1919. Serial No. 292,313.

*To all whom it may concern:*

Be it known that I, THOMAS HILL, a citizen of the United States, and a resident of the city of New York, borough of Manhattan, in the county and State of New York, have invented a new and Improved Hose-Clamp, of which the following is a full, clear, and exact description.

This invention relates to clamps and has particular reference to hose clamps or analogous devices.

Among the objects of the invention is to provide a clamp including anchorage means and a flexible band adapted to be secured at remote portions of the anchorage means for the purpose of contracting the band for any desired purpose.

A more definite object of the invention is to provide a clamping device for a hose or other purposes including an anchor device comprising a cradle having a rounded concave bearing and a rocker coöperating with the bearing whereby the direction of strain applied to the band, or its equivalent, will always accommodate itself automatically to the most advantageous condition irrespective of the size or diameter of the hose or other device encircled by the clamping band.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a cross section of a joint of hose showing one form of my improvement applied therearound.

Fig. 2 is a vertical transverse section of the same.

Fig. 3 is a plan view of the same, the free end portion of the band being in section.

Fig. 4 is a detail perspective view of the cradle portion of the anchorage means.

Fig. 5 is a similar view of the rocker.

Fig. 6 is a transverse sectional view showing the same mechanism adapted to a rod or part of minute diameter.

Fig. 7 is a rear elevation of the same parts as in Fig. 6.

Fig. 8 is a modified form and adaptation of my improvement shown as employed for contracting a piston ring.

Fig. 9 is a plan view of the upper portion of Fig. 8; and

Fig. 10 is a detail perspective view of the eye-bolt member shown in Figs. 8 and 9.

Referring now more specifically to the drawings I show my improvement as comprising a tension member 15 in the form of a screw having a head 16 grooved for a screw driver or the like and having fitted to the threaded portion of the screw a nut 17.

The clamp includes anchorage means comprising a cradle member 18 shown in detail in Fig. 4 and comprising two side wings 19 occupying substantially parallel planes and of approximately triangular form. These wings are connected by a concave wall 20 and a crossbar 21. This cradle member may be made in any suitable manner or of any approved material, but I find that it may be made cheaply and conveniently from sheet metal suitably stamped into shape. The wing members 19 are provided with concave alined bearing seats 22 and the concave wall 20 is preferably notched at 23 along the center of the edge nearest to the crossbar 21 and substantially midway between the ends of the wings. The anchorage device includes also a rocker 24 having a convex bearing surface 25 adapted as shown in Figs. 1 to 3 as bearing in the bearing seats 22 at the ends of the wings while the screw bolt 15 projects through a central hole 26 whose axis is perpendicular to the axis of the rocker 24 as a whole. If desired the ends of the rocker may be provided with parallel lips 27 adapted to engage over the outer faces of the wings 19 and so prevent any possibility of endwise displacement of the rocker in practice. The surface of the rocker opposite the rounded bearing surface 25 may be of any suitable shape, but if the device is stamped from sheet metal the form will probably be preferably of the form shown in Fig. 5 in which there is a concavity 28 formed therein. The head of the screw bolt bears against this face of the rocker in the adaptation shown in Figs. 1 to 7.

The compression member 29 may be of any suitable nature such as a narrow strip of thin sheet brass or other strip material which may be found of a suitable width or which may be cut to suitable width. As indicated in Figs. 2 and 3 this compression member comprises a strip of metal having holes 30 formed therein at relatively close intervals throughout its length and so the compression member may be snipped or broken off by a workman to adapt the length thereof to any job he may be engaged in. As shown in Fig. 2 one end of the compression member is folded or bent around the crossbar 21 with the free end thereof folded inward against the hose or other part being clamped where it will be held by friction between the hose and the main portion of the compression member. The remote portion of the compression member is then connected to the tension member 15 by passing the screw through one of the holes 30 at approximately a right length for the particular job, but with the nut 17 relatively loose and applied on the free end of the screw on the outside of the compression member, the shoulder portion of the screw being journaled in the hole 26 of the rocker and with the lips 27 directed toward the nut. The workman then passes the compression member around the hose or the like, and holding cradle with the concave wall 20 thereof against the hose, he will then bring the tension member and rocker portions around the hose and set the rocker in the bearing seats 22. The parts will be then self-sustaining and he will apply force to the tension member by use of a screw driver applied to the head 16. The draft exerted by the tightening of the tension member will cause the automatic alinement of the tension member screw to the direction of the draft. The nut will bite into a relatively sharp angle of the compression member between the screw and the hose and so will be held from rotation. The rocker will automatically roll or adjust itself in the bearing seats 22 according to the diameter of the hose or part encompassed by the compression member. When the rocker is once applied to the cradle it is impossible for it to slip out of place. From the nature of the connection between the compression member and the cross bar 21 the approximate length of the compression member may be readily determined inasmuch as the inturned free end of the compression member lying between the hose and the main portion may be of any variable length. There is no possibility for the tension member 15 to cramp or bind during the tightening or loosening action due to the peculiar coöperation between the nut and the free end of the compression member and the nature of the rocker acting in the bearings of the cradle. Consequently with the least amount of power and danger of stripping the threads of the tension member the maximum compression may be effected.

In the application of the clamp to a small object such as a rod or small pipe as shown in Figs. 6 and 7 the cradle may be given a variable relation to the other part although the action of the tension member remains substantially the same as has already been described. In this adaptation the anchorage end of the compression member is slipped through the wall 20 and around the crossbar 21 in a direction opposite from that above described, while the rocker is made to bear against the concave surface of the wall 20, the tension screw after passing through the rocker being threaded through the space between the wall 20 and the crossbar 21 and made to bear in the notch 23. After the free end of the screw is projected through one of the holes 30 of the compression member the nut is applied against the outside of the compression member substantially in the same manner as before stated, but is drawn by the action of the screw directly toward the inner or convex surface of the wall 20 and close to the same between the wings 19.

In the form of the invention shown in the last set of figures the tension member is in the nature of an eyebolt 31 having a threaded portion $15^a$ and a head $16^a$ in place of the head 16 of the first form. The eye 32 is in the nature of a slot perpendicular to the axis of the screw and is adapted to receive one end of the compression member $29^a$, the end passing inward and foldable under the main portion of the compression member while the remote end of the compression member is applied around the crossbar 21 of the cradle the same as as in Figs. 1 and 2. With the use of the threaded eyebolt 31 it is unnecessary to provide perforations in the compression member or to weaken the same by puncturing it. Any piece of strap material either metallic or fabric may be employed with this device and with complete satisfaction. In the application of this form of the invention to a job the rocker 24 is slipped upon the eyebolt and a winged nut 33 is then run upon the threaded end of the tension member. The hub portion of the winged nut bears against the flatter side of the rocker while the rounded side thereof bears in the bearing seats 22 the same as shown in Fig. 2. Obviously the clamp may be employed for use around a hose or other devices of any desired size or diameter, the variation in size being compensated for by varying the length of the compression member. One of the useful purposes to which I apply this device is in the compression of piston rings as shown at 34 in the assembling of a reciprocating engine. Ordinarily it is a difficult matter to insert a piston into a cylinder because of the expanding action of the rings. In the use of this device the clamp is placed around the piston ring after the ring has been put around the piston and then tension is applied to the clamp which serves to so compress the ring as to bring it within the surface of the cylinder. That is to say after the device has been applied to the ring to compress it and with the winged nut turned as shown in Figs. 8 and 9 the piston may be slipped into place and the edge of the cylinder will cause the slipping of the clamp from the ring while the ring enters the cylinder in compressed position. The clamp is then free for use on the next ring so that the entire set of rings may be compressed and inserted in rapid succession. Obviously for this purpose and in the provision of the slipping of the clamps from the rings only a moderate amount of compression is required.

I claim:

1. The herein described clamp comprising an anchorage device having two concave bearing portions, a tension device coöperating with the anchorage device and having free rocking action with respect to one concave bearing portion of the anchorage device, and a compression member having its remote ends connected respectively to the anchorage device and the tension member substantially on opposite sides of the other concave bearing portion.

2. In a clamp of the character set forth, the combination of an anchorage device including a cradle having a rounded bottom bearing and a rocker having a convex bearing surface coöperating therewith, a tension member including a threaded member extending loosely through the rocker in a direction perpendicular to the axis of the rocker, said tension member also including a member threaded complemental to the screw, and a flexible compression member having one portion engaged with the cradle and another portion engaged with the tension device.

3. In a clamp of the class set forth, the combination of an anchorage device including a cradle having parallel wings formed with registering rounded bearing seats and means integral with the wings serving as a connection between them to hold them parallel, said anchorage device including also a rocker having a rounded bearing surface coöperating with the bearing seats of the cradle, a tension member coöperating with the rocker, and a compression member having one end connected to the cradle and the other connected to the tension member, substantially as set forth.

THOMAS HILL.